Nov. 28, 1967  J. B. BURNELL  3,354,873
CONSTANT SPEED CONTROL SYSTEM
Filed Oct. 21, 1965
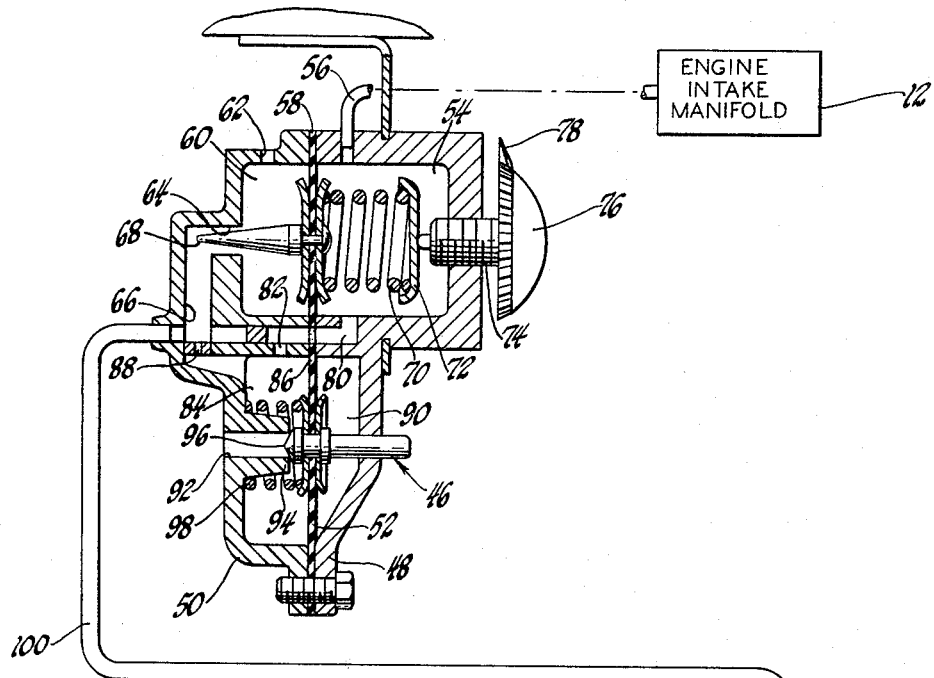
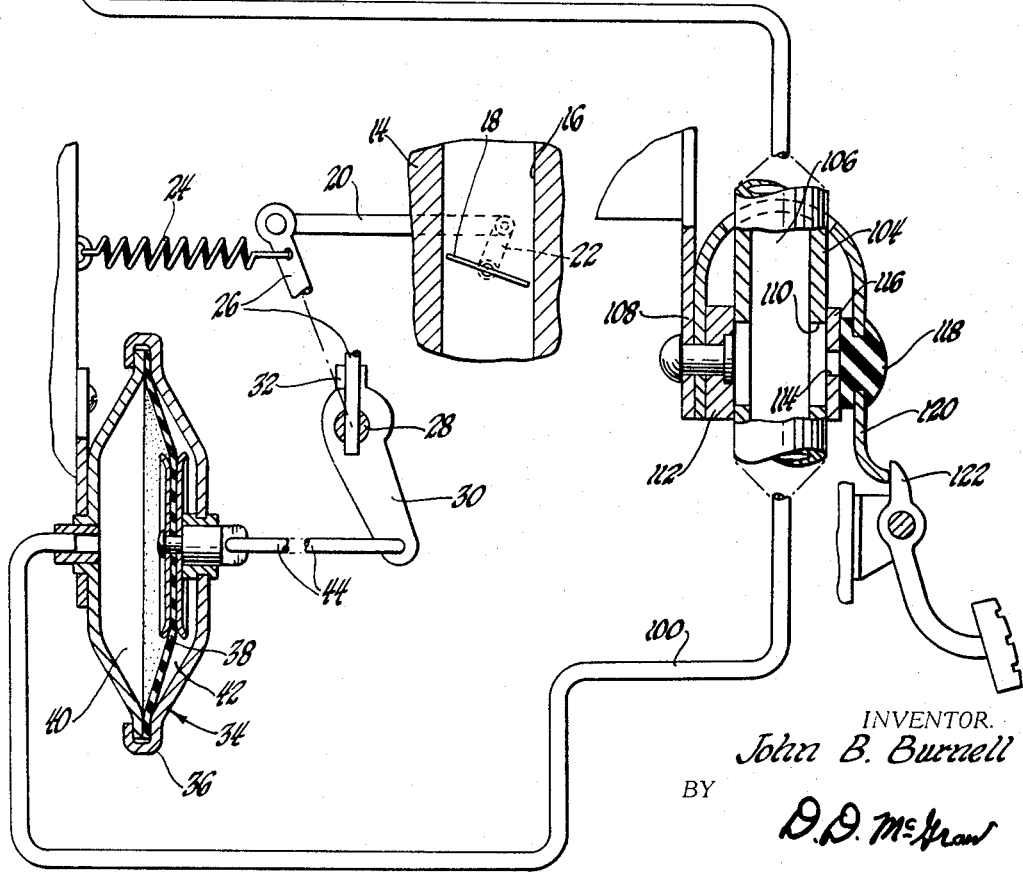
INVENTOR.
John B. Burnell
BY
D.D. McGraw
ATTORNEY

3,354,873
CONSTANT SPEED CONTROL SYSTEM
John B. Burnell, Brighton, Victoria, Australia, assignor to General Motors Corporation, Detroit, Mich., a corporation of Delaware
Filed Oct. 21, 1965, Ser. No. 500,057
15 Claims. (Cl. 123—103)

The invention relates to a system for maintaining a constant vehicle road speed, and more particularly to one utilizing the characteristics of the vehicle engine in its operation on a constant speed curve. When a vehicle is traveling at a road speed in the range of approximately 40 to 80 m.p.m., the engine has a generally linear speed curve which is a function of throttle valve opening and engine intake manifold vacuum. At a constant vehicle road load, which in turn is a constant engine load, the engine, and therefore the vehicle, will operate at a constant speed at a predetermined intake manifold vacuum and a predetermined throttle valve opening. As the road load demand changes due to changes in terrain or wind conditions, for example, the engine intake manifold vacuum will change. If the throttle valve opening remains constant, the engine speed, and therefore the vehicle speed, will decrease when the load increases, and will increase when the load decreases. An increase in load demand is reflected by an increase in absolute manifold pressure, which is commonly referred to as a decrease in manifold vacuum. Similarly when the load decreases, the absolute manifold pressure will decrease. This is commonly referred to as an increase in manifold vacuum. For a different load or power requirement condition, a different throttle opening and a different value of manifold pressure is required to maintain a constant engine and vehicle speed.

The system embodying the invention operates the engine, and therefore the vehicle, so that a substantially constant speed is maintained by changing the throttle valve opening as the load demand changes, reflected by changes of manifold pressure, occur. By utilizing this characteristic of the engine and controlling the factors which establish a constant speed curve, a road speed control system is provided which can maintain the vehicle at a desired speed under varying load conditions without requiring an actual vehicle speed sensing mechanism connected to the output of the transmission or a vehicle wheel. This is accomplished by providing a control mechanism which senses changes in load demand as reflected by changes in manifold pressure and generating an output signal to a pressure differential actuating servomotor connected to the throttle linkage which will change the position of the throttle valve so as to maintain the engine, and therefore the vehicle, on a selected constant speed curve by establishing different throttle opening and manifold pressure values commensurate with such a curve. For example, when the vehicle is traveling under a steady road load condition at a selected constant road speed, and the road load requirements change in an increasing sense, the absolute manifold pressure will increase slightly. This increase in pressure is sensed by a control mechanism which actuates the throttle valve controlling servomotor to open the throttle valve to increase engine power. This has the effect on the manifold pressure of further increasing it momentarily, but tending to decrease it as the supplied power meets the load demand, so that a new stable condition is obtained with a greater throttle opening and a slightly greater absolute manifold pressure. Similarly when the road load requirement decreases, the absolute manifold pressure decreases and the control system senses this fact and causes the throttle valve operating servomotor to slightly decrease the throttle opening. This establishes a new stable condition wherein the absolute manifold pressure is slightly higher while the throttle valve opening is slightly lower, maintaining the engine at a constant speed so that the vehicle travels at the same constant speed as before, but under a different load condition.

The throttle valve servomotor is so arranged that an increase in pressure differential acting across the power wall thereof moves the throttle valve in an opening direction. The control system, therefore, senses a decrease in absolute manifold pressure, for example, and causes an effective increase in the pressure differential acting on the servomotor when the road load requirement is increased. When the road load requirement is decreased, the pressure differential acting across the power wall to the servomotor is likewise decreased and the throttle linkage return spring is permitted to move the throttle valve in a valve closing direction.

A system embodying the invention also utilizes an actuating valve arrangement wherein the control mechanism output signal to the throttle valve servomotor cannot be generated until a manual operation is performed which closes the actuating valve and eliminates an atmospheric bleed to a portion of the control mechanism connected to a passage through which the output signal passes. The system is self-correcting since the change in throttle valve opening increases the delivered power, causing the load demand to lessen, resulting in a further change in manifold pressure in the other direction from the corrective change due to opening of the throttle, which causes the throttle valve opening to correct to a smaller extent in the opposite direction so that it tends to reach a stable condition.

A suitable spoiler valve arrangement is provided to be actuated by a vehicle control element such as the brake pedal so that the throttle valve servomotor is vented to atmosphere and the pressure differential acting across the power wall thereof is eliminated, thereby returning full control of the engine throttle valve to the manual throttle valve linkage including the accelerator pedal and the throttle valve closing spring. The control system is so arranged that when the spoiler valve is opened, the actuating valve is also opened and remains upen until it is again manually closed. The actuating valve is held closed by a pressure differential generated by manifold pressure and atmospheric pressure so that the manifold pressure as modified by an atmospheric bleed must be sufficient to hold the actuating valve closed before the system is operable to control the speed of the engine and the vehicle.

In the drawings:

The figure is a schematic representation of a system embodying the invention in association with a vehicle engine, with parts being broken away and in section.

The vehicle in which the system is installed as illustrated in the drawing has an engine 10 including an intake manifold 12 and a carburetor 14 having an air intake passage 16 controlled by the throttle valve 18. A throttle control linkage is provided for normal manual actuation of the throttle valve by an accelerator pedal. Pertinent portions of the throttle linkage illustrated include the throttle valve rod 20 which is connected to the valve arm 22 and is also connected with a throttle valve closing or return spring 24. The linkage is so arranged in the usual manner that depression of the vehicle accelerator pedal will move the throttle linkage against the force of the throttle valve closing spring to open air intake passage 16 to a greater extent by pivotal movement of the throttle valve. The throttle valve linkage also includes a link 26 which is connected to the throttle valve rod 20 and is pivoted on a shaft 28. An arm 30 is also pivoted on shaft 28 and has a tab 32 thereon which is engageable with link 26. As shown in the drawing, clockwise movement of arm 30 about shaft 28 with the tab 32 engaged with the link 26 causes the link to move clockwise and act against the force of the throttle closing spring 24 to move the throttle valve rod 20 in a direction to open the throttle valve 18. The arm 30 and its tab 32 do not prevent movement of the throttle linkage including link 26 and rod 20 to a position opening the throttle valve by a greater amount than that obtained by movement of arm 30 and tab 32. Thus the vehicle can be manually accelerated beyond the position established by tab 32.

A throttle valve actuated servomotor 34 includes a housing 36 having a diaphragm 38 therein forming a power wall and dividing the housing into a control pressure chamber 40 and an atmospheric pressure chamber 42. The power wall 38 is connected to a control rod 44 which is in turn connected to arm 30. The power wall 38 is movable in accordance with the pressure differential acting thereon as the control pressure chamber 40 has a pressure established therein which is different from atmospheric pressure. When the control pressure in chamber 40 is subatmospheric, the arrangement is such that the power wall 38 will move arm 30 to cause link 26 and the throttle valve rod 20 to so move against the force of the throttle valve closing spring 24 as to open the throttle valve when the tab 32 is in engagement with the link 26.

A control assembly 46 is provided and includes a housing having a first section 48 and a second section 50. The housing sections are suitably secured together with a diaphragm and sealing member 52 separating the two housing sections. The first housing section 48 has a chamber 54 formed therein which is connected by a conduit 56 to the engine intake manifold so that manifold pressure is contained within the chamber 54. The diaphragm 52 has a valve control section 58 which forms one wall of the chamber 54. The housing second section 50 has a chamber 60 formed therein on the other side of diaphragm section 58 so that diaphragm valve control section 58 also forms a wall of that chamber. Chamber 60 is vented to atmospheric pressure through port 62. An orifice 64 is formed in a portion of the housing section 50 which forms a wall of chamber 60 opposite the diaphragm valve control section 58 and is connected to an outlet signal chamber or passage 66 on the other side thereof from chamber 60. A control valve member 68 is secured to the diaphragm valve control section 58 so that movement of the control valve member relative to the orifice 64 controls the effective area of that orifice. In order to obtain a fine control, the control valve member 68 may be formed with a taper so that the valve extends into the orifice 64. Thus movement of the control valve member 68 toward the orifice 64 decreases the effective area of the orifice, and movement of the control valve member away from the orifice 64 increases the effective area of the orifice. A control spring 70, shown as a compression spring, acts against the diaphragm valve control section 58 to urge the control valve in the orifice area decreasing direction. The end of the spring opposite the diaphragm is seated on an adjustable spring seat 72. The seat is adjusted to change the load on the spring by means of a threaded member 74 which is turned by a control knob 76. The control knob may have an indicating pointer 78 thereon which cooperates with a suitable dial to indicate a desired vehicle speed setting.

Passage means through the housing sections are also provided which connect the chamber 54 with the passage 66 through restriction means. As illustrated in the drawing, this passage means includes the passage 80, a first restrictive orifice 82, a third chamber 84 formed by a portion of housing section 50 and an actuating valve section 86 of diaphragm 52. A second restrictive orifice 88, which is smaller in effective area than restrictive orifice 82, connects chamber 84 with passage 66. Housing section 48 has a fourth chamber 90 formed therein on the other side of the diaphragm actuating valve section 86 from chamber 84, and this chamber is vented to atmospheric pressure. An atmospheric vent passage 92 formed through a portion of housing section 50 terminates in chamber 84 with a valve seat 94 formed thereon. An actuating valve 96 is connected to the diaphragm actuating valve section 86 so that it may be moved to seat on valve seat 94, closing atmospheric vent passage 92. A valve may have an extension through chamber 90 which is accessible to the vehicle operator so that it may be operated as a push button to move the actuating valve 96 into seating engagement with the valve seat 94. A spring 98 acts on the diaphragm actuating valve section 86, and therefore on the actuating valve 96, urging the valve away from the valve seat 94.

An outlet control signal conduit 100 connects the control assembly passage 66 with the control pressure chamber 40 of the servomotor 34 through the brake actuated spoiler valve assembly 102. This valve is illustrated as including a tube 104 having a center passage 106 therethrough with the portion of conduit 100 connecting the passage 66 of the control valve assembly being connected to one end thereof and the portion of conduit 100 connected to the servomotor 34 being connected to the other end thereof. The tube 104 is suitably secured to a mounting bracket 108. The tube has an atmospheric vent aperture 110 formed through a wall thereof. A mounting sleeve 112 is sealingly secured about tube 104 and provides a part of the tube mounting. The sleeve covers the tube aperture 110 and has the side thereof covering this aperture formed with an orifice 114 and providing a valve seat 116 surrounding orifice 114. A valve member 118 is positioned relative to valve seat 116 so that it opens and closes orifice 114. The valve member 118 is mounted on a leaf spring 120 which is biased so that in its free position the valve is unseated and orifice 114 is open to atmospheric pressure. One end of spring 120 is engaged by a tab 122 associated with the vehicle brake pedal mechanism so that, when the brake pedal is in the brake release position, the tab acts against the force of spring 120 to position the valve member 118 in sealing relation against valve seat 116 to prevent the connection of passage 106 to the tube 104 with atmospheric pressure. When the brake pedal is moved in the brake apply direction, tab 122 is likewise moved, permitting spring 120 to move the valve member 118 away from the valve seat 116, thereby venting atmospheric pressure into passage 106 and tube 104. This will likewise vent atmospheric pressure into the pressure chamber 40 of the servomotor, eliminating the pressure differential effective across the power wall 38 and thereby eliminating the effect of the servomotor on the throttle valve linkage. Opening of the brake actuated spoiler valve assembly also causes atmospheric pressure to be vented through conduit 100 to passage 66 of the control assembly. Sufficient atmospheric pressure will also pass through restrictive orifice 88 to raise the absolute pressure in the actuating valve chamber 84 so that the pressure differential acting across the diaphragm actuating valve section 86 is decreased to the extent that spring 98 moves actuating valve 96 away from its valve seat 94, thereby directly venting chamber 84 to atmosphere through vent passage 92.

When the vehicle engine is operating, manifold pressure is transmitted through conduit 56 to chamber 54. The pressure actually existing in chamber 54, with the system in the inoperable condition, is actually closer to atmospheric pressure than manifold pressure since atmospheric pressure enters that chamber through restrictive orifice 82 and passage 80. Since only atmospheric pressure is provided to passage 66 under these conditions, atmospheric pressure exists in conduit 100 and control pressure chamber 40 of the servomotor even through the brake valve 118 is in its normal closed position. The actuating valve 96 is in its normally open position since its spring 98 holds it away from its valve seat and since atmospheric pressure is on both sides of the diaphragm section 86. Vent passage 92 is of such a size that it will not permit the buildup of a sufficient pressure differential across diaphragm section 86 as to hold the actuating valve in its closed position against the force of spring 98. The engine will operate on a generally linear engine speed-manifold pressure constant throttle valve-opening curve at a speed comparable to approximately 40 m.p.h. of vehicle speed with the transmission operating in the normal drive range. Obviously, for different engine and vehicle characteristics, this speed can be changed and, therefore, the 40 m.p.h. point is taken only as a common illustrative speed. In some vehicles this may be considerably lower and in other vehicles may be somewhat higher. Restrictive orifice 82 is somewhat larger than restrictive orifice 88 and it cannot establish an operable pressure in chamber 54 at the speed at which restrictive orifice 82 can do so when passage 92 is closed.

When the operator desires to energize the system after he has manually brought the vehicle to a sufficient road speed and, therefore, engine speed, he pushes the actuating button formed by the extension of valve 96 so that he manually sets the actuating valve against its seat 94. This brings restrictive orifice 88 into operation. Chamber 84 is evacuated through restrictive orifice 82, passage 80, chamber 54 and conduit 56 and a sufficient pressure differential is thereby created across the diaphragm section 86 to hold the valve 96 closed against the valve opening force of spring 98. The pressure in chamber 54, therefore, more nearly approaches the engine intake manifold pressure since atmospheric bleed thereto is now controlled by the smaller restrictive orifice 88. This creates a greater pressure differential across the diaphragm section 58 so that a force is generated which moves the diaphragm, and therefore the control valve 68, against the force of control spring 70 and opens the orifice 64 to some extent. This orifice, therefore, controls the amount of atmospheric bleed into passage 66 passing through port 62 and atmospheric pressure chamber 60. A pressure output signal is, therefore, generated in passage 66 which is transmitted to conduit 100 to the control pressure chamber 40 and the servomotor 34. Since this is a subatmospheric pressure, the pressure differential created across the power wall 38 moves the power wall to the left, causing arm 30 to be moved clockwise. The tab 32 will likewise move clockwise and will engage link 26. The point at which control valve 68 actually opens is determined by the load on control spring 70 which is set in accordance with the desired speed setting. Thus the pressure differential acting across diaphragm section 58 must be sufficient to overcome this load before the control valve will open orifice 64. Thus the proper amount of effective open area of orifice 64 will occur when the vehicle has reached the set speed so that the system will stabilize at the set speed. This will occur at a particular throttle valve opening for the constant engine speed curve on which the system is to be operated as determined by the load on control spring 70, and at a particular engine intake manifold pressure. If the system is operating under a steady road load condition the throttle valve opening and intake manifold pressure values for maintaining the engine and, therefore, the vehicle at the set speed will remain constant. When the road load demand on the engine changes, the engine intake manifold pressure will change due to a slight change in engine speed. Expressed on an absolute pressure basis, an increase in engine load is reflected by an increase in manifold pressure without a throttle valve change. This changes the pressure differential acting against diaphragm section 58 by decreasing it so that the control valve 68 moves to slightly decrease the effective area of orifice 64, therefore, cutting down the amount of atmospheric pressure into passage 66. Therefore, the absolute pressure in passage 66 will decrease slightly and is transmitted through conduit 100 to control pressure chamber 40 of the servomotor 34. This creates a greater pressure differential acting on the servomotor power wall 38 causing the movement of arm 30 clockwise so that tab 32 also moves link 26 clockwise against the force of the throttle closing spring 24 to open the throttle valve 18 an additional amount. The increase in throttle valve opening will increase the power delivered by the engine so that it balances the increased speed requirements set up by the increased road load. The opening of throttle valve 18 will also cause a slight increase in absolute manifold pressure which will have a slight but smaller effect on the position of the control valve 68, giving a regenerative effect while the power requirement is greater than the delivered power. When the delivered power closely approaches the actual power requirement, this regenerative effect on the throttle valve opening and the corresponding manifold pressure will be comparable to values for slight overspeed, and the system will have a slight degenerative effect which will adjust the throttle valve opening and therefore the manifold pressure toward the values which are required for selected constant speed curve operation. When there is sufficient manifold pressure furnished as compared to the throttle valve opening to operate the engine on the preset constant speed curve, the system will again be stabilized with the engine operating at the same constant speed as before, and the vehicle driving at the same road speed as before, but with different throttle opening and intake manifold pressure values. The reverse effect takes place when there is a decrease in road load requirements, causing a decrease in absolute intake manifold pressure, causing the control valve 68 to open orifice 64 to a greater extent thereby decreasing the pressure differential acting against the servomotor power wall 38, permitting the throttle valve closing spring to move link 26 counterclockwise, moving arm 30 with it, and also slightly closing the throttle valve until a new set of throttle valve and manifold pressure characteristics are obtained to maintain the engine at the selected constant speed and, therefore, the vehicle at the selected constant speed.

What is claimed is:
1. A road speed control mechanism for a vehicle having an engine provided with an intake manifold which is a source of subatmospheric absolute pressure and a throttle valve having a closing spring,
   said mechanism comprising:
   first fluid conduit means having in series said source of subatmospheric pressure,
   a first orifice restriction,
   a first selectively closed atmospheric vent,
   a second orifice restriction smaller in cross section area than said first orifice restriction,
   a second selectively closed atmospheric vent,
   and a subatmospheric pressure operated servomotor connected to move said throttle valve in an opening direction upon a decrease in subatmospheric absolute pressure in said servomotor;
   second fluid conduit means connected with said first fluid conduit means intermediate said second orifice restriction and said second vent and having in series a variable area orifice provided with a movable valve, and an atmospheric vent;
   a second subatmospheric pressure operated servomotor connected to move said movable valve to vary the area of said variable area orifice;
   and third fluid conduit means connected with said first fluid conduit means intermediate said source of subatmospheric pressure and said first orifice restriction and further connected to said second servomotor;
   a decrease in subatmospheric absolute pressure from said source of subatmospheric pressure operating said second servomotor to increase the area of said variable area orifice to increase the subatmospheric absolute pressure operating said first servomotor to permit movement of said throttle valve by said closing spring in a throttle valve closing direction, and an increase in subatmospheric absolute pressure from said source of subatmospheric absolute pressure operating said second servomotor to decrease the area of said variable area orifice to decrease the subatmospheric absolute pressure operating said first servomotor to move said throttle valve in a throttle valve opening direction.

2. In a vehicle having an engine intake manifold producing a constant road load vacuum pressure inversely and substantially proportional to vehicle speed in a vehicle speed range on the order of 40 to 80 miles per hour and having a throttle valve provided with a closing spring, a vehicle road speed control mechanism comprising a servomotor connected to said throttle valve to open said throttle valve as vacuum applied to said servomotor increases and to permit closing of said throttle valve as vacuum applied to said servomotor decreases, means including a vacuum regulator valve responsive to vacuum from said engine intake manifold to increase vacuum applied to said servomotor upon a decrease in vacuum from said intake manifold caused by an increase in road load and to decrease vacuum applied to said servomotor upon an increase in vacuum from said intake manifold caused by a decrease in road load whereby said servomotor controls vehicle road speed through movements of said throttle valve in response to vacuum changes in said engine intake manifold.

3. In a vehicle, the combination of an engine having a throttle valve, a source of variable air pressure which changes in absolute pressure as a result of load demand changes on said engine, and a predetermined relationship between throttle valve position and pressure of said source and engine power output at a stable vehicle road speed, vehicle road speed stabilizing means comprising control means responsive to said changes in absolute pressure in either direction in response to load demand changes on said engine, and means controlled by said control means for moving said throttle valve to change said absolute pressure in the same direction as said pressure was changed by load demand to adjust engine power output to the load demand requirements to keep the vehicle at the stable road speed.

4. In a vehicle, the combination of an engine having a throttle valve and a source of air which changes in absolute pressure by an amount and in a direction which directly varies in accordance with the amount and direction of power demand changes made on the engine by changes in vehicle road load and is further variable directly in accordance with the amount of change in throttle valve opening, control means responsive to said changes in absolute pressure, and means controlled by said control means for producing a force for moving said throttle valve in a direction to change the absolute pressure in the same direction to change the engine delivered power in direct relation to the power demand changes to maintain the vehicle at a stable road speed.

5. The combination of claim 4 in which said force varies in directive sense in direct relation to the directive sense of the absolute change of said pressure caused by power demand changes and varies in magnitude in accordance with the amount of the change of said pressure.

6. In a vehicle, the combination of an engine having a throttle valve and a source of air which changes in absolute pressure by an amount and in a direction which varies directly in accordance with vehicle road load changes at an initial throttle valve equilibrium position and also varies directly in accordance with the amount and direction of movement of the throttle valve from the initial equilibrium position, means for operating said engine substantially on a constant engine speed curve to give a substantially constant vehicle road speed under varying vehicle road loads, comprising control means responsive to said changes in absolute pressure in response to a vehicle road load change, and means controlled by said control means for moving said throttle valve to further change said absolute pressure in the same direction and in an amount to compensate for the change in engine speed and vehicle speed caused by a vehicle road load change to return the engine to operation on the constant engine speed curve and therefore to return the vehicle to the constant vehicle road speed.

7. The combination of claim 6 in which said control means includes a pressure responsive valve responsive to changes in absolute pressure from said source of air and conduit means receiving pressure from said source of air and having a variable atmospheric bleed orifice controlled by said valve to establish a modified absolute pressure in said conduit means and connected to deliver said modified absolute pressure to said means controlled by said control means.

8. The combination of claim 6 further including conduit means interconnecting in series relation said source of air and said control means and said means controlled by said control means, said control means further including a normally open valve having one side connected to atmospheric air and the other side connected to said conduit means and means releasably holding said normally open valve closed, said normally closed valve when open venting said means controlled by said control means to atmosphere thereby rendering it inoperative to move said throttle valve under control of said control means.

9. The combination of claim 8, further including a vehicle control element, said normally open valve being held closed by said vehicle control element when said element is inactive and being permitted to open when said element is actuated.

10. The combination of claim 8, said normally open valve having normally operated valve closing means and valve holding means responsive to a predetermined minimum pressure differential between said source of air absolute pressure and atmospheric air to hold said normally open valve closed.

11. The combination of claim 7, said control means further including a normally open pressure sensitive manually closable valve having valve holding and moving means responsive to the absolute pressure received by said conduit means and to atmospheric pressure and after said manually closed valve is closed holding said manually closed valve closed so long as at least a predetermined pressure differential exists between atmospheric pressure and the absolute pressure received from said source of air by said conduit means, and moving said manually closed valve to the normally open position when the actual pressure differential is less than said predetermined pressure differential.

12. In a system for controlling apparatus including an engine having a force-actuatable throttle mechanism and a source of fluid pressure which changes in response to changes in the load on the engine and in response to changes of the position of the throttle mechanism and having a stable constant output speed operating characteristic at an initial throttle mechanism position and an initial engine load and an initial fluid pressure of said source and requiring different throttle mechanism positions at different engine loads and different fluid pressures of said source, the combination of sensing means for sensing variations in the fluid pressure of said source resulting from changes in the load on the engine and changing in accordance therewith, a fluid pressure chamber, control means connected to said sensing means for changing the effective fluid pressure in said chamber in direction and magnitude in response to changes of said sensing means, means including force-producing means coupled to the throttle mechanism for applying a force to the throttle mechanism in accordance with the pressure in said chamber, and means including said throttle mechanism for changing the fluid pressure of the source with a change in the fluid pressure in said chamber produced by a change in load on the engine in the same direction as the change in pressure produced in said chamber in response to the change of said sensing means to maintain substantially the same engine stable constant output speed characteristic at a different throttle mechanism position and engine load and fluid pressure of said source.

13. In a vehicle, the combination of an engine having a throttle valve and an intake manifold providing a source of air pressure which changes in absolute pressure by an amount and in a direction which varies directly in accordance with vehicle road load changes at an initial throttle valve equilibrium position and also varies directly in accordance with the amount and direction of movement of the throttle valve from the initial equilibrium position, means for operating said engine substantially on a constant engine speed curve to give a substantially constant vehicle road speed under varying vehicle road loads, comprising a housing having a first chamber connected to receive manifold pressure from said intake manifold and a second chamber connected to receive atmospheric air pressure, a variable area bleed orifice connected to said second chamber on one side thereof, an outlet pressure signal passage connected to the other side of said orifice, a passage having restrictive orifice means therein connecting said first chamber to said outlet pressure signal passage, a diaphragm providing a pressure responsive power wall separating said first and second chambers, a control valve movable by said diaphragm and controlling the area of said variable area bleed orifice in accordance with the changing pressure differential across said diaphragm which changes in accordance with changes in pressure in said first chamber which changes in response to changes in engine intake manifold pressure, a control spring acting on said control valve to urge said control valve in the bleed orifice closing direction in opposition to the pressure differential acting on said diaphragm and having means associated therewith for changing the spring load thereof, and a power servo having a pressure differential responsive power wall and connected to said outlet pressure signal passage on one side of said power wall and atmospheric pressure on the other side of said power wall, said power wall being connected to said throttle valve to urge said throttle valve in the opening direction as the pressure differential acting on said power wall increases in response to a decrease in the pressure differential acting on said diaphragm.

14. The mechanism of claim 13 further comprising vehicle operator operated valve means including a normally open valve having pressure differential responsive valve closing means and an atmospheric pressure connected orifice controlled by said valve and connected to said passage having restrictive orifice means therein and venting said outlet pressure signal passage to atmospheric pressure when open and when closed by the operator being held closed by a pressure differential exerted across said pressure differential responsive valve closing means generated by atmospheric pressure on one side thereof and the pressure in said first chamber acting on the other side thereof only so long as the last named pressure differential exceeds a predetermined value.

15. The mechanism of claim 14, said restrictive orifice means including a first restrictive orifice having one side thereof always exposed to the pressure in said first chamber and a second restrictive orifice having one side thereof always exposed to the pressure in said outlet pressure signal passage and being smaller in area than said first orifice, said vehicle operator operated valve means atmospheric pressure connected orifice when open being connected to the other sides of said first and second orifices.

References Cited
UNITED STATES PATENTS 2,672,855  3/1954  Thomas _____ 123—103
3,125,178  3/1964  Stoltman _____ 123—103 X RALPH D. BLAKESLEE, *Primary Examiner.*